United States Patent
Simonsen et al.

(10) Patent No.: US 8,140,322 B2
(45) Date of Patent: Mar. 20, 2012

(54) METHOD OF MANAGING ERROR RISK IN LANGUAGE TRANSLATION

(75) Inventors: Kai Simonsen, San Rafael, CA (US); Marc H. Miller, Waban, MA (US)

(73) Assignee: Translations.com, New York, NY (US)

( * ) Notice: Subject to any disclaimer, the term of this patent is extended or adjusted under 35 U.S.C. 154(b) by 1079 days.

(21) Appl. No.: 12/012,207

(22) Filed: Jan. 31, 2008

(65) Prior Publication Data

US 2008/0183459 A1  Jul. 31, 2008

Related U.S. Application Data

(60) Provisional application No. 60/898,478, filed on Jan. 31, 2007.

(51) Int. Cl.
*G06F 17/20* (2006.01)
*G06F 17/28* (2006.01)
*G06F 17/27* (2006.01)
*G10L 15/00* (2006.01)
*G10L 15/04* (2006.01)
*G10L 21/00* (2006.01)
*A61B 5/00* (2006.01)

(52) U.S. Cl. .............. 704/2; 704/1; 704/4; 704/5; 704/7; 704/8; 704/9; 704/231; 704/251; 704/277; 715/256; 600/300

(58) Field of Classification Search .............. 704/1, 2–9, 704/231, 251, 277; 715/256
See application file for complete search history.

(56) References Cited

U.S. PATENT DOCUMENTS

| | | | | |
|---|---|---|---|---|
| 5,768,603 | A * | 6/1998 | Brown et al. | 704/9 |
| 6,154,720 | A * | 11/2000 | Onishi et al. | 704/2 |
| 7,624,027 | B1 * | 11/2009 | Stern et al. | 705/2 |
| 7,653,531 | B2 * | 1/2010 | Sneddon et al. | 704/10 |
| 7,716,037 | B2 * | 5/2010 | Precoda et al. | 704/2 |
| 2002/0111787 | A1 * | 8/2002 | Knyphausen et al. | 704/2 |
| 2002/0169592 | A1 * | 11/2002 | Aityan | 704/2 |
| 2004/0193870 | A1 * | 9/2004 | Redlich et al. | 713/154 |
| 2006/0100850 | A1 * | 5/2006 | Lee | 704/8 |
| 2006/0136824 | A1 * | 6/2006 | Lin | 715/531 |
| 2007/0294076 | A1 * | 12/2007 | Shore et al. | 704/2 |

* cited by examiner

*Primary Examiner* — Paras Shah
(74) *Attorney, Agent, or Firm* — Weingarten, Schurgin, Gagnebin & Lebovici LLP

(57) ABSTRACT

Methods for analyzing, evaluating, and controlling risk of errors in language translation of medical device labeling are disclosed. The disclosed methods include identifying the risk level of the device; identifying the safety function(s) of the content that is translated; evaluating risks associated with the translation process; and analyzing this risk information and applying it in the selection of resources and in the design and execution of processes, to effectively mitigate the risk of safety related translation errors in labeling for medical devices.

12 Claims, 8 Drawing Sheets

*FIG. 2*

NOTES: only grey fields, dropdowns, and notes require user input
Enter all information as available. Pick numbers/categories that best match your particular project scenario. If in doubt, pick the higher risk category.

Date completed: _____ Completed by: _____

Enter no. of languages:
FIGS Pt    Scan, nl    CJK, el    EU Access    Other

Total WC per lang.
Total no. of languages    0
No. of files
No. of tasks*    *count FO, T, E, BE, DTP, FQA

| RESULTS: copy/paste into Translation Quality Plan | | | |
|---|---|---|---|
| PM Risk | 16% | 3.1 | Low |
| Resource Risk | 20% | 4.1 | Low-Medium |
| Technical Risk | 20% | 4.0 | Low |
| Linguistic Risk | 24% | 4.9 | Low-Medium |
| Product Risk | 20% | 4.0 | Low |
| PROJECT RISK SCORE: | | 20.1 | Low-Medium |

Notes: Indicate Initial Risk Mitigation Strategy for high-risk areas!

PM RISK — 16% — 12
Hand-off risk:
- File hand-off    0    0%
- Instructions/Complexity    Low - simple, boilerplate    20%
- Project type    New content (no TM/leverage)    20%

Scheduling risk*:
- File hand-off    0    0%
- Turnaround    Low - Flexible    20%
- Production capacity    Low workload    25%
- Delivery (open/committed)    Lowest - Open    20%
- Client Review    Lowest - no review (process audit)    20%

RESOURCE RISK — 20% — 14
- Languages    FIGSPt only    20%
- Scheduling*    (from above)    16%
- Capacity    (from above)    25%

TECHNICAL RISK — 20% — 16
- Project type    New layout (Crimson)    20%
- DTP Task complexity    Low (no/min.cleanup, no graphics)    20%
- Application complexity    Low - Simple or text only    20%
- Language complexity    20%

LINGUISTIC RISK — 24% — 18
- Project type    (from above)    20%
- Context    Full context    25%
- Reference    Low - good product ref., glossaries available    25%
- Subject matter    General (non technical)    25%
- Source doc ling. quality    Well written, with no obvious flaws    25%
- Memory    No or controlled memory    25%
- Use/Audience    Informational use    33%
- Scheduling    (AVG from above)    16%

PRODUCT RISK <info>    20% — 15
- Product Risk    Lowest - Other    20%

CRIMSON

Project Risk Analysis    Page 1 of 1    Risk Management File_RevB

| | Project Risk Management Report |
|---|---|
| Project No.:        Project Manager: <br> Deliverables / Part No.: | |
| All planned processes, resources, and risk control measures have been implemented successfully for the above deliverables, as evidenced by review of the following project records and details from the project risk management file. ||
| Project/Risk Management Record | Notes |
| Deliverables have been completed in accordance with planned processes and resources as outlined in the Translation Quality Plan and Project Specifications. | |
| Detailed workflow description, resource considerations, and in-process decisions are outlined in the Project Management Plan. | |
| Linguistic production has been completed following the guidance of the Linguistic Risk Analysis (LRA). All perceived linguistic hazards have been addressed by Linguistic QA. | |
| Elevated project risks and serious error risks have been adequately addressed and mitigated as indicated in the Project Hazard List. | |
| All tasks relating to the deliverables have been carried out by qualified, approved, or trained individuals, as listed in the Project Resource Table. | |
| Deliverables have successfully passed Final Project Audit (FPA) prior to release. Serious error findings during FPA have been evaluated and appropriately resolved, as indicated in the FPA form. | |

Signed, Project Manager:

Project Risk Management Report

Confidential
May not be reproduced without permission from Crimson Life Sciences
TRANSLATION EVALUATION

Evaluator Name: _____ Evaluation Number: _____

I. Please review and score the translation using the following error categories (enter the number of <u>unique</u> 'serious' and 'minor' errors for each error type in the corresponding box);

SAE J2450 scoring

|  | # of serious errors | Subtotal | # of minor errors | Subtotal |  |
|---|---|---|---|---|---|
| *Wrong Term (WT) |  | *5 | 0 |  | *3 | 0 |
| *Omission Error (OM) |  | *5 | 0 |  | *3 | 0 |
| *Addition (AD) |  | *5 | 0 |  | *1 | 0 |
| *Syntactic Error (SE) |  | *5 | 0 |  | *1 | 0 |
| *Word Structure & Agreement Error (SA) |  | *5 | 0 |  | *1 | 0 |
| *Misspelling Error (SP) |  | *5 | 0 |  | *1 | 0 |
| *Punctuation Error (PE) |  | *5 | 0 |  | *1 | 0 |
| *Miscellaneous Error (ME) |  | *5 | 0 |  | *1 | 0 |
|  |  |  | 0 |  | 0 | Total |

NOTE: Please refer to SAE J2450 reference material for additional guidance.

For each 'serious' error, please provide a brief explanation (attach add'l sheet if needed):

| Error | Explanation |
|---|---|
|  |  |
|  |  |
|  |  |
|  |  |

II. Please answer the following questions and provide a 2-3 line explanation for each question:

1. Does the translation read like current literature in the field (standard industry terminology, accurate concept rendering, appropriate style/formulaic language, etc.)?
   ☐ Yes
   ☐ No
   Please comment:

2. Does the translation... (Please check one option and explain.)
   ☐ stand on its own?
   ☐ suffer from minor source language interference?
   ☐ not stand on its own; i.e., the reader needs to refer to the source text to understand the translation?
   Please comment:

III. Please provide any additional comments you consider relevant:

Crimson Life Sciences
Translation Evaluation Form

*FIG. 8*

| | | |
|---|---|---|
| Client | PM | Product Type (IVD/MD) |
| Generic Project Name | Quote No. | Pro-Forma Plan |
| | Project No. | |

Project brief: Special Instructions / Specifications

<briefly summarize what the project is about>  <add instructions and add'l specs and any planned deviations from Pro-Forma Plan chosen and reasons for the deviations>

Relevant project/client history:
<include info or pointers on related past projects and/or client dossier>

| | Memory matches |
|---|---|
| LINK CLIENT DOSSIER ▲ | Do not edit (default) |

| | | (optional) | (optional) |
|---|---|---|---|
| Process steps | Strategy notes | Target dates | Milestone/Scheduling |
| LRA | | | |
| Format Opt | | | |
| Translate | | | |
| Edit | | | |
| Finalize | | | |
| BackEdit | | | |
| LBE | | | |
| DTP Clean | | | |
| FQA 1 | | | |
| DTP 1 | | | |
| FQA 2 | | | |
| DTP 2 | | | |
| FPA | | | |

Project Plan    1/1    CRIMSON   Risk Management File_RevB

FIG. 9

| | |
|---|---|
| Confidential | |
| May not be reproduced without permission from Crimson Life Sciences | |

LINGUISTIC RISK ANALYSIS
Note: this document is optimized for on-screen use, not for printing.

| | | |
|---|---|---|
| Project Number | | |
| Client | | |
| Project Manager | | |
| Linguistic Contact | (name) | |
| | (e-mail) | |
| Source Word Count | | |
| Target Languages | | |

Document/project history:
(Information about related past projects, any files to be used as reference, such as glossaries and client-supplied reference documents, etc.)
Background information about the product/client:
(Brief rundown of product, type of document, audience. Include link to client's main website)

Linguistic guidelines

Proper names:
(products and companies; trademarks; references to external publications, standards, authorities, ...)
Device labeling:
(words and symbols on the actual device; display messages; screen shots)
Abbreviations/acronyms:
(guidelines on whether to localize, expand or match source, etc,)
Units and conversions:
(As a rule, use metric only where client uses US units only; metric first, US in parentheses where client uses both. Check client's conversions for accuracy.)
Style considerations:
(imperative/infinitive, active/passive voice, ...)
Consistency issues:
(cross-references, consistency of updates with existing transactions, ...)
Miscellaneous:
(miscellaneous guidelines and notes)

Linguistic hazard sections:
The following items in this document represent linguistic hazards, i.e., text that poses a safety risk if translated incorrectly.
•

Known errors in the original:

| Source text error | Clarification | Linguistic hazard? |
|---|---|---|
| | | |

Ambiguous or challenging source text:

| Source text | Explanation<br>Note: Unless otherwise instructed, DO NOT translate these explanations. They are only intended to help you choose the best translation | Linguistic hazard? |
|---|---|---|
| | | |

*******

Linguistic Risk Analysis Form Rev. B
Page 1 of 1

METHOD OF MANAGING ERROR RISK IN LANGUAGE TRANSLATION

CROSS REFERENCE TO RELATED APPLICATIONS

This application claims priority under 35 U.S.C. §119(e) of U.S. Provisional Patent Application No. 60/898,478 filed Jan. 31, 2007, the disclosure of which is hereby incorporated by reference herein.

STATEMENT REGARDING FEDERALLY SPONSORED RESEARCH OR DEVELOPMENT

Not Applicable

BACKGROUND OF THE INVENTION

The present invention relates generally to methods for analyzing, evaluating, and controlling risk of language translation errors in connection with medical device labeling, and, more specifically, to risk managing methods that identify the inherent risk level of the device; identify the safety functions of the content that is translated; evaluate the risks associated with the translation process; and analyze this risk information and apply it in the selection of resources and in the design and execution of processes to mitigate the risk of safety-related translation errors effectively.

INVENTION PHILOSOPHY

Medical Device Labeling

The present invention concerns commercial language translation of safety information and/or data that accompany medical devices (medical device "labeling"). Product labeling is used to identify individual devices and to communicate safety-related instructions and performance-related information to users, patients, consumers, and the like.

The U.S. Food and Drug Administration (FDA) defines a medical instrument as "an instrument, apparatus, implement, machine, contrivance, implant, in vitro reagent, or other similar or related article, including a component part, or accessory which is * * * intended for use in the diagnosis of disease or other conditions, or in the cure, mitigation, treatment, or prevention of disease, in man or other animals, or intended to affect the structure or any function of the body of man or other animals, and which does not achieve any of its primary intended purposes through chemical action within or on the body of man or other animals and which is not dependent upon being metabolized for the achievement of any of its primary intended purposes."

Typically, national governments and groups of governments delegate responsibility for the regulation of medical devices, which would include its labeling, to an organization or agency that is sometimes referred to as a Competent Authority (CA). For example, the FDA is the CA in the United States, Health Canada is the CA in Canada, the Ministry of Health, Labor, and Welfare is the CA in Japan, the Federal Institute for Drugs and Medical Devices is the CA in Germany, and so forth.

These national agencies are responsible for enforcement of laws and regulations that pertain to the safe use of medical devices, which includes labeling. For example, contracting member states of the European Union (EU) coordinate medical device regulation via Directives of the European Commission (EC). The Directives that govern the manufacture and sale of medical devices within the EU include the Medical Device Directive (MDD 93/42/EEC), the Active Implantable Medical Device Directive (AIMDD 90/385/EEC), and the In Vitro Device Directive (IVDD 98/79/EEC).

The primary standard governing the manufacture of medical devices in Europe is ISO 13485:2003 ("Medical devices-Quality Management systems-Requirements for regulatory purposes"). Regulating authorities in Canada, Japan, China, Australia, and elsewhere, also utilize ISO 13485:2003 to ensure the safe and effective manufacture, labeling, and use of medical devices.

Despite regional differences, all medical device regulatory systems share certain key components, which include, without limitation, basic regulatory criteria that devices have to meet; classification schemes for determining the level of regulatory oversight; assessment of technical documentation before a device can be marketed; risk management throughout the device's life cycle; effective quality management systems; registration of a firm and representation in the country or regional market; and procedures for handling complaint and reporting adverse events.

In many instances, accompanying safety and instructional documentation is a labeling requirement under all major regulatory systems. Labeling, which some regional and some national regulations refer to as "information supplied by the manufacturer", is also specifically termed: Instruction for Use (IFU), Direction for Use (DFU), Package Insert (PI), operator's manual, software User Interface (UI), etc. Web sites that contain medical device product information are also generally considered "labeling" by regulators.

Under the European system (which has been widely adopted worldwide), evidence of appropriate control in device design and manufacture is based on conformance with so-called "Essential Requirements" of the relevant Directives. Fulfillment of these Essential Requirements can be demonstrated through compliance with specific standards.

To conform with the Essential Requirements of EC Directives, manufacturers must undergo a process termed "CE Marking". More particularly, by affixing a CE marking to a device or product, the manufacturer, its authorized representative, or person placing the medical device in the stream of commerce or putting it into service avers that the device or product satisfies all of the essential requirements of the applicable Directives. For medical devices, the requirements of CE marking are based on the relative risk classification of the device.

Risk Classification

Risk classification is largely based on the nature of the device, e.g., active, sterile, re-usable, and so forth; how long the device is in contact with the body when used; the part of the body with which the device will be in contact; how the device will attach to or penetrate into the body; and the intended use for the device.

Risk classification systems vary internationally but are generally structured similarly to distinguish low, medium, and high risk devices. For example, Class I medical devices are designated as low risk under the EU classification system, and, therefore, require only general controls, e.g., establishment registration and device labeling. Indeed, Class I device manufacturers may self-certify conformity with applicable EC Directives in order to affix the CE mark to their product. For higher risk devices, such as Class II devices, special controls are required, which can include special labeling requirements, guidance documents, mandatory performance standards, and/or post-market surveillance. Class III devices carry the highest risk for health and human safety. Hence, general (Class I) and special (Class II) controls are insufficient to manage the more substantial safety risk. Consequently, Class III devices require pre-market approval and, furthermore, are subject to design dossier approval.

For Class II and Class III devices, conformity with the Essential Requirements must be assessed via third party inspection. The third party who carries out these conformity assessments is termed a "Notified Body". As the title suggests, Notified Bodies are "notified", which is to say, "nominated", for approval and appointment to the EU by the government of a Contracting Member State.

Notified Bodies are the only recognized CE marking approval bodies for the CE marking approval of medium- and high-risk devices recognized. Notified Bodies also carry out the design dossier review and approvals for Class III device manufacturers.

In addition to the various national regulatory components previously discussed, there is an important supra-national guidance-issuing body and a risk management standard with significant impact for industry: The Global Harmonization Task Force (GHTF) and ISO 14971. The GHTF, whose founding members were the EU, the U.S., Canada, Australia, and Japan, was formed in 1992 to achieve greater uniformity between national medical device regulatory systems. One or the purposes of the GHTF is to encourage convergence in regulatory practices through publication and dissemination of harmonized documents on basic regulatory practices.

ISO 14971, entitled "Medical devices—Application of risk management to medical devices", addresses the analysis and mitigation of risk. In pertinent part, ISO 14971 states that:

This International Standard should be regarded as a framework for effective management by the manufacturer of the risks associated with the use of medical devices. The requirements that it contains provide a framework within which experience, insight and judgment are applied systematically to manage these risks.

Language Translation

Language translation is the appropriate conversion of text authored in one (source) language into another (target) language. Necessary to enable effective communication between speakers/readers of different languages, translation is applied in various commercial and non-commercial settings for a variety of purposes. For example, common settings include literary translation, e.g., fiction, poetry, and the like, legal translation, e.g., agreements, patents, and the like, and commercial translation in connection with trade, e.g., sales, marketing, and promotional content or product packaging/labeling.

Commercial translation deals with translation in the service of commercial activities. In general, commercial translation is a professional service that is commonly driven by locale-specific market dynamics and legal or regulatory requirements. In the context of labeling, German law demands that user instructions for medical devices sold in Germany be available in German. In other commercial instances not involving medical devices, although regulations may not require translation into the native language, market forces and consumer preference for the same may hamper sales that do not include a translation. Accordingly, market requirements often dictate that goods, such as computer software or user's manuals, must be translated.

In today's international marketplace, to cover a wide array of subject matters, provide low cost, and enable quick time-to-market, commercial translation is largely an outsourced service. Translation shoppers contract with translation vendors, companies, agencies or individuals (collectively hereinafter "vendors") to carry out the translation, which is typically provided as a full service that may or may not include value-added services, such as Quality Assurance, Desktop Publishing/Formatting, and Project Management.

A fundamental principle in translation, however, is that each language includes unique systems of expression that often have no exact one-to-one correspondence in another language. Idioms, colloquialisms, and the like from one source language also are not easily translated into a target language. In short, text authored in one (source) language cannot be exactly reproduced in another (target) language without difficulty, which is to say without requiring more time and greater cost.

Rather, translation represents the conversion of text from one linguistic system (source language) to another linguistic system (target language). The success of the translation process, therefore, relies on an appropriate conversion and conveyance of meaning, rather than an exact, mechanical word-for-word transfer from one language into another.

Translation Quality Control

The quality of translation is generally judged by the absence of loss, modification, or addition of meaning as well as by adherence to target language rules and conventions. Like all human activity, however, language translation is subjective and subject to variation and human error. Perceived variations in meaning between the original (source) language and translated content or linguistic errors in the target text are considered "mis-translations" or "translation errors".

In standard translation processes, the risk of translation errors is mitigated by means of process and resource controls. These controls can include redundant reviews, translation process support, e.g., through glossaries or reference materials, and increased resource qualification, e.g., assigning the translation task to translators with advanced knowledge of the subject matter or of the document type to be translated.

Effective quality control measures, however, vary according to document and subject matter complexity and the intended purpose and requirements of the translated document. For instance, one may desire to translate a simple business letter for informational purposes. In this case, an appropriate translation process might be extremely basic, e.g., translation by anyone with source/target language familiarity, with no further review required. In another instance, complex user instructions for using hazardous medical equipment may require translation in accordance with regulatory purposes connected with safety, export, and import. In the application, an elaborate quality assurance process may be required in order to produce a document that meets its intended labeling purpose of safe and effective operation as well as all relevant national and supra-national regulatory requirements.

Risk and Risk Management of Medical Devices

All activity is accompanied by some risk. Risk management is a key consideration for medical devices due to their direct impact on health and human safety. Indeed, safety and instructional information that accompany a medical device play a critical role in this overall risk management effort by providing important guidance to consumers for safe use. Industry standards, national laws, and regulatory guidance statements make this clear.

Although medical device manufacturers are required to design products that are "inherently safe", the use of any device involves a measure of risk. All risk that cannot be mitigated through design must be addressed (as a minimum) in accompanying product documentation. This important risk management function of product documentation is specifically identified in the medical device industry standard, ISO 14971. The accuracy and preciseness of translated documentation are therefore vital in effectively communicating required safety information in overseas markets in accordance with national laws.

When medical devices are sold in overseas markets, including Europe, Asia, and South and Latin America, national law generally requires medical device safety and instructional information to be distributed in one of the official languages of the country. The process for generating this local language version is outsourced to a commercial translation vendor. Problematically, under the world's major medical device regulatory schemes, device manufacturers cannot escape liability for their outsourced processes, such as translations. In other words, manufacturers still bear the responsibility any harm or damage resulting from labeling errors. Some of this liability can be handled by purchase of insurance, indemnification, and so forth.

Serious errors in translated device labeling may render a manufacturer non-compliant with risk management regulations and standards such as ISO 14971. "Serious errors" are defined as any error that is likely to cause harm to the user, operator, patient or consumer; damage to the product or to equipment used in conjunction with the product; non-conformity with regulatory requirements; damage to the product's marketability; and/or damage to the manufacturer's reputation.

Within the realm of translation, inherent translation risks are residual risks that cannot be eliminated. Inherent translation risks, however, can be mitigated through a number of risk management techniques. For example, specialized, tested, audited, and documented translation resources, i.e., translators, can be used to mitigate some of the inherent, resource-dependent risks. Furthermore, at the process level, inherent risks can be effectively addressed through quality control activities, such as redundant checks, audits, testing, and proofreading steps by supervisors.

Because all activity within a translation project—and, most commonly, document translation and text formatting—carries inherent and specific risks, a process is needed to control these risks throughout the process, for instance through quality control steps following each production activity. In addition, the nature of some translation-related risks is such that their scope is not readily identifiable, requiring "probing" or "testing" of the source text to determine its translatability and potential linguistic or other risks. For instance, a linguistic review of the source text by a source-language native speaker, who is familiar with the translation activity, prior to translation may reveal linguistic properties, such as complexities, flaws, ambiguities, and so forth, that may present a risk during the subsequent translation process, which is carried out by a target-language native speaker. Once identified, these potential errors can be addressed through specific training of translation resources across all target languages.

To achieve the highest possible translation quality within the constraints of a commercial translation activity, taking into account variables such as time available and cost, all risks related to the activity, to the extent possible, must be identified, analyzed, and treated prior to engaging in the activity and/or mitigated during the activity. This can be done using a classic risk management approach, which is well-known to those of ordinary skill in the art.

However, disadvantageously, the risk of translation errors associated with medical device labeling is particularly problematic due to the safety and risk management function of the content. Because error risk cannot be completely eliminated within the translation activity, it must be minimized through mitigation and strategic application of risk controls. Moreover, because the probability of translation errors in labeling cannot be eliminated, a translation quality system must be outcome-driven, based on the assumption that the consumer will act on any translation error. Consequently, any translation process must include a risk analysis component that enables the strategic application of resource and process controls according to risk level and severity of outcome.

Standard translation quality assurance processes that are not risk analysis-driven are insufficient and impractical to address these requirements appropriately and to minimize the risk of safety-related, medical device labeling translation errors effectively. Accordingly, a method for managing translation risk with particular emphasis on serious or safety-related translation errors for medical device applications, to ensure translation quality through risk minimization, is desirable.

BRIEF SUMMARY OF THE INVENTION

The present invention provides methods for analyzing, evaluating, and controlling risk of errors in language translation of medical device labeling. More specifically, the disclosed methods include identifying the risk level (classification) of the device; identifying the safety functions of the message content that is translated; evaluating the inherent and process risks associated with the translation process; and analyzing this risk information and applying it in the selection of resources and in the design and execution of processes, to effectively mitigate the risk of safety related translation errors.

More particularly, the present invention discloses a method for evaluating the risk level in a translation of a medical device labeling document from a first language to a second language. The method includes assessing a risk classification of the device; identifying the nature and intended purpose of the document; and providing an assessment of the risk to the consumer posed by translation errors.

The method includes identifying the document type from a list comprising documents relating to training, instruction for use, marketing, Web site, adverse event reporting, recalls, or regulatory submission. Furthermore, the method includes providing a translation risk assessment as a function of the inherencies of the languages and the various language character sets, e.g., Latin, Cyrillic, Arabic, Asian characters, and so forth.

It is an object of the disclosed method to have a back-editor whose native language is the first (source) language review the translated document to help overcome limitations inherent in having the document translated by a native speaker of the target language.

BRIEF DESCRIPTION OF THE SEVERAL VIEWS OF THE DRAWING

The invention will be more fully understood with reference to the following Detailed Description of the Invention in conjunction with the Drawings of which:

FIG. 2 shows an exemplary Risk Calculator in accordance with the present invention;

FIG. 3 shows an exemplary Risk Management Report in accordance with the present invention;

FIG. 6 shows an exemplary Translation Evaluation form in accordance with the present invention;

FIG. 8 shows an exemplary Risk Management File in accordance with the present invention; and FIG. 9 shows an exemplary Linguistic Risk Analysis form in accordance with the present invention.

DETAILED DESCRIPTION OF THE INVENTION

Figure 1:
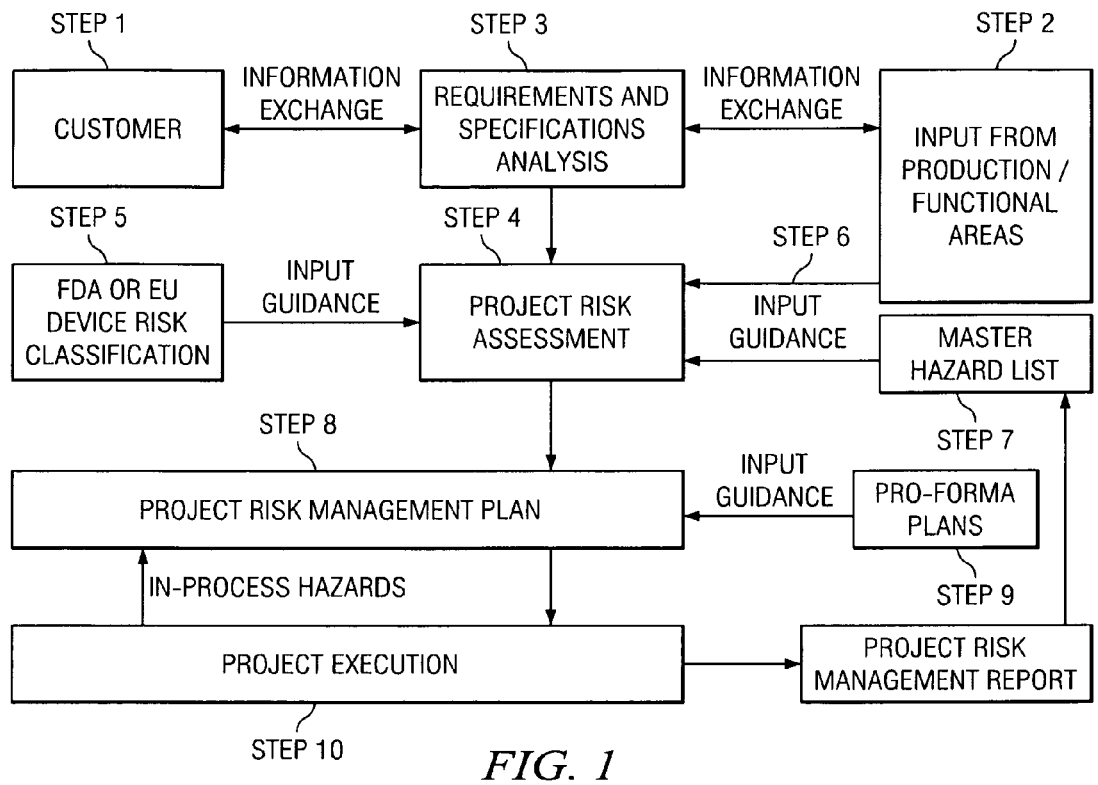
FIG. 1 shows a flow chart of an illustrative method of the initial phases of risk management in accordance with the present invention.

All human activity can be evaluated in terms of risk, which applies to the activity itself as well as to the product of the activity. Commonly, this is referred to as "inherent risk". In the context of a translation-related activity, the product of the activity can be, for example, a translated document, a software user interface, a Web site, a database, and/or other text- or electronic-based content. Each of these products represents a potential hazard for the user, consumer, patient, and the like (collectively hereinafter "consumer") as well as for the manufacturer of the product. For the consumer and/or the manufacturer, the resulting risk may be more or less severe. The current analysis assumes that the purpose of the translation activity is to create, from a related document in a source language, a translated product in a target language that is appropriate for the intended use of the translated document.

By example, in the case of a product registration form, a translation process that fails to manage the inherent risks of the activity may lead to an inappropriately translated registration form. This, in turn, may frustrate the purpose of the registration. The risk to the consumer is based on the commercial value of the registration. The risk to the manufacturer is the commercial value of the consumer information. In this instance, the risk to each may be judged to be relatively low, notwithstanding any regulatory requirements that govern the registration.

However, any language translation process that fails to manage the inherent risks of the activity that leads to an inappropriately translated product or label may lead to serious consumer risk and/or harm. The resulting negative publicity, e.g., from resulting litigation and/or recall, may affect the manufacturer's market share and/or cast the manufacturer in an undesirable light. Further, an erroneous translated document may also violate regulatory requirements, leading to sanctions and additional commercial and organizational harm. In such a case, the risks to each of the consumer and the manufacturer may be judged to be relatively severe. Thus, within the commercial realm, the product of the translation activity should be evaluated according to its risk for the consumer and for the manufacturer.

For the consumer, the risk of mistranslation can be quantified or assigned as a function of the nature of translated document type and of the severity of the mistranslation. For example, in the case of an Instruction for Use (IFU) for a complex medical device, a simple typographic error may produce very little risk to the consumer or, alternatively, it may produce tremendous risk should the error cause the consumer to use the device in an inappropriate or incorrect manner.

As previously mentioned, translation activity carries inherent risks for error, i.e., mistranslations, for several reasons. First, is the problem inherent between a source language and a target language. Translation is not a direct or mechanical conversion of lexical units (word-for-word translation) from one language to another; but, rather, a creative process (similar to originally authoring the translated text in the target language) that seeks to create or reproduce the equivalent meaning of a text written in a first (source) language in another (target) language. An "equivalent meaning" herein refers to content, context, style, tone, register, and so forth.

Second, translations, by their very nature, remove a text from the control and intent of its author, offering the translator control or "poetic license" over the final text. Unless the translation into the target language is carried out by the author of the original source text, risk of misinterpretation or misconstruction of the intended meaning of the source text is possible. Even were the author of the original source text to translate the text into the target language, the author's imperfect knowledge of the target language generates risk.

Third, then, is the "native fluency dilemma", by which, in order to express the equivalent meaning of a source-language text in a target language fully, the translator must have native fluency in the target language; notwithstanding that, to comprehend the source-language text fully, without any danger of misinterpreting or misconstruing the source text, native fluency in both the target and the source languages is required. Obviously, these requirements are mutually exclusive (unless the poly-lingual author is also the translator of his or her own document) and must be dealt with through translation process design.

Finally, as a cognitive activity, every task within the translation activity is subject to human error. Although error rates can be measured empirically, they are unpredictable and subject to variation depending on a number of environmental factors.

Risk Management System, Project Risk Analysis and Process Planning

Figure 4:
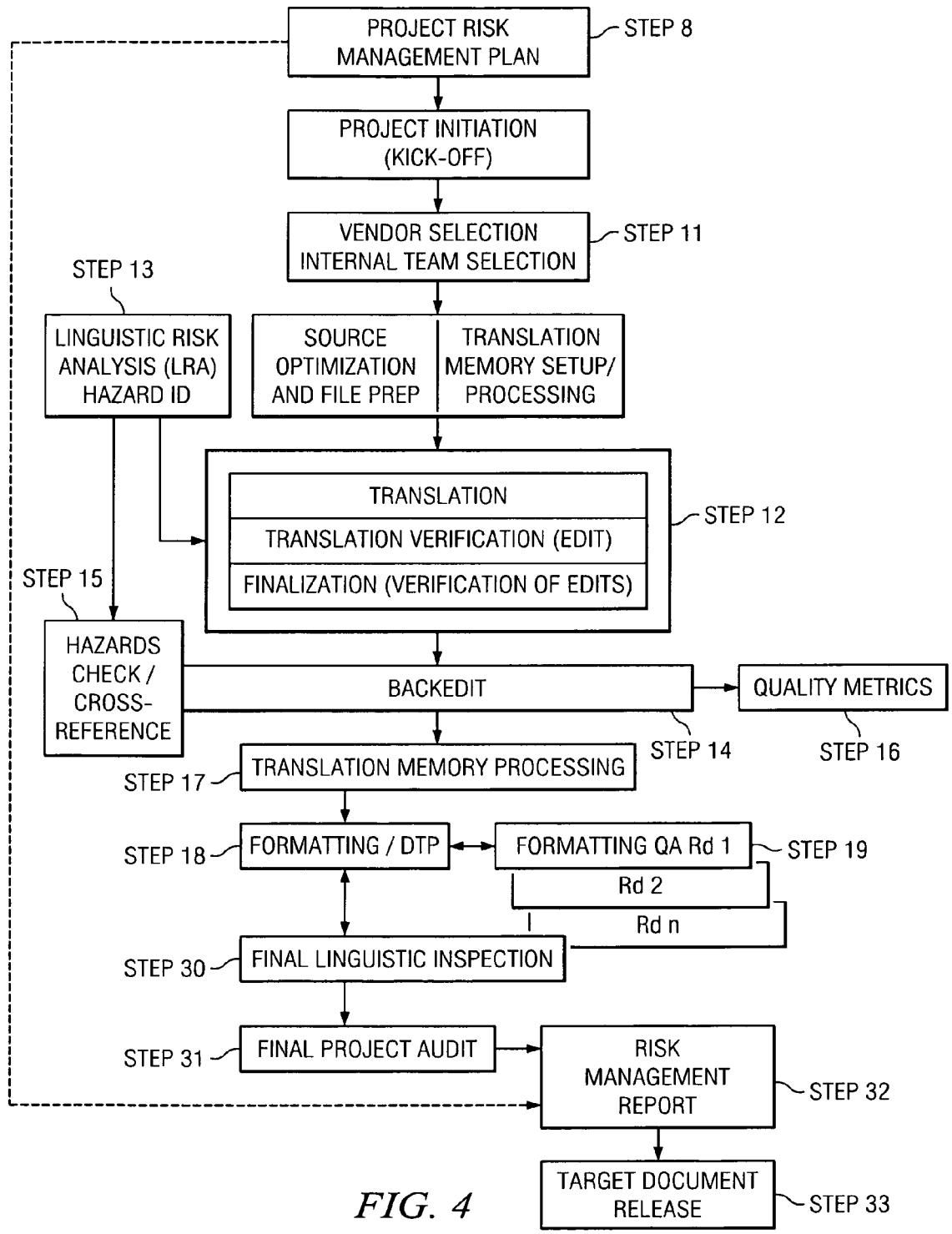
FIG. 4 shows a flow chart of an illustrative method of the execution phase of risk management in accordance with the present invention.

FIG. 1 and FIG. 4 show an illustrative risk management process flow chart. In FIG. 1, the initial phase and first steps of the illustrative method involve gathering information to identify the scope and nature of the project, the customer's expectations, and applicable functional and production data, which are all integrated and analyzed to formulate a risk assessment for translating the document and a risk management plan for managing and mitigating translation-related risks associated with the project. In FIG. 4, the second or execution phase of the illustrative method involves executing the risk assessment plan and providing feedback such that the risk assessment plan remains a flexible, living document.

For example, at the onset, during the initial phase, manufacturers provide and exchange job- or task-specific information interactively (STEP 1) with a risk management service provider or a translation vendor (collectively hereinafter "service provide"). The information exchange can include, without limitation, review of a client dossier(s) and/or review of project histories of related client projects or past project management plans. The job- and task-specific information can also include the customer's expectations and desired deliverables.

During the initial phase, the service provider also collects historical risk management input from various production and functional areas (STEP 2) that will be involved to bring the project to completion. These production and functional areas are discussed in greater detail below and can include without limitation: general concepts of project management, linguistic quality assurance/quality control (QA/QC), desktop publishing or formatting (DTP/formatting), formatting QA/QC, and so forth.

Using and integrating the results of STEP 1 and STEP 2 as input, the service provider then performs a safety-related analysis of project requirements and specifications (STEP 3)

and, further, formulates a project risk assessment (STEP 4). The purpose or role of the project risk assessment (STEP 4) is to establish processes and resources that are most appropriate for satisfying project requirements while mitigating serious error risk. More particularly, the service provider can perform a project risk assessment (STEP 4) using a Project Risk Calculator.

The Project Risk Calculator 10 shown illustratively in FIG. 2 is adapted to provide an initial project risk analysis and to highlight elevated risk sub-areas for which a compatible risk-level mitigation strategy(ies) can be formulated and tracked. The Project Risk Calculator 10 is a management tool that takes into consideration key risks, such as project management risk (also known as hand-off risk) 12, resource risk 14, technical risk 16, linguistic risk 18, and product risk 15. As shown in FIG. 2, a project risk score 11—typically a real number between 1 (low risk) and 10 (high risk)—is equal to the weighted average of the various individual risk sub-areas, each of which is assigned a predetermined weight with respect to the whole.

For example, the linguistic risk 18 associated with the Project Risk Calculator 10 shown in FIG. 2 is weighted most heavily at 24 percent. Thus, the numerical project risk score 11 will be slightly more influenced by the linguistic risk sub-area 18 than by any of the other four risk sub-areas. Each of the resource risk 14, technical risk 16, and product risk 15 is weighted at 20 percent. The project management risk 12 is weighted the least at 16 percent. Those of ordinary skill in the art can appreciate that the weight percentages are illustrative and the method can be practiced using other, comparable percentages for each of the various individual risks.

Project Management Risk

Project management risk results from the nature of administrative or bureaucratic aspects of the translation activity. More particularly, commercial translations are typically organized within the framework of projects. Within the project framework, business or regulatory requirements often necessitate multi-language documentation, multiple documents to be translated, typesetting/formatting activities, and so forth. As the number of target languages, files, and other specific requirements increase, the risk for administrative errors that can impact the quality of the translation(s) and that can lead to translation errors, e.g., through file mix-up, insufficient or incorrect project specifications, communications errors, and the like, also increases.

Scheduling Risk

Time-sensitive commercial translation activities are often subject to critical time frames and deadlines. Production schedules, regulatory deadlines, filing dates, product launch dates, and other time-to-market considerations can restrict the amount or availability of time allocated to the translation of product documentation in such a way that translation process requirements cannot be effectively fulfilled. Hence, there exists an independent, temporal scheduling risk, which is a part of the project management risk.

Resources Risk

When dealing with professional services, risks associated with commercial translation is directly related to the professional "resource", i.e., the translation vendor, who provides the specified service. Thus, the principal hazard in resource risk management is the ability and reliability of the translator(s) providing the services. Consequently, effective risk management depends on a careful selection, training, and/or auditing of translation vendors. The risk management method targets resources based on the criticality of their role within the service process.

For illustrative purposes only, a two-tiered resource risk management system for translation vendors will be described. Basic prerequisites prior to resource selection should include as a minimum: native language skills in the target language; adequate expertise in the source language; and subject matter expertise.

For example, initial screening and testing criteria for a Tier 1 (primary) vendor can include specialized credentials and qualification, such as native language skills in the target language and experience as a translator for and/or as a medical practitioner familiar with medical devices and/or IVDs for a period of years, e.g., five year. An advanced technical degree could also be a criterion. By comparison, screening and testing criteria for a Tier 2 (secondary) vendor can include without limitation: native language skills in the target language and experience as a translator for a period of years, e.g., three year, of which at least 25 percent or some comparable percent was spent translating medical devices and/or IVDs.

Where verification and acceptance of translation vendors is based in whole or in part on risk mitigation, particular emphasis can be and must be placed on the subjective nature of the likelihood of error occurrence and the ease of error detectability and on the severity of the error, which is measurable objectively. Because of the subjective portion, mitigation should be event-based. More specifically, vendor testing or accreditation can be based on industry-specific and industry-accepted control tests, such as the SAE J2450 Quality Metric Standard, which is discussed in greater detail below.

For example, tiering standards for Tier 1 vendors can include, without limitation, the absence of serious errors, the absence of minor omission (OM) errors, high marks for translation style, and no more than about 10 points in the "Minor Error" category of the SAE J2450 Quality Metric Standard. In contrast, tiering standards for Tier 2 vendors can include, without limitation, no more than one serious error, the absence of negative marks for translation style, and no more than about 20 points in the "Minor Error" category of the SAE J2450 Quality Metric Standard.

Optionally, the vendor selection process may include a heightened, "borderline" override procedure through which translation vendors who have otherwise exceeded the Tier 2 serious error and/or "Minor Error" thresholds, can still be approved for inclusion as a Tier 2 vendor.

Upon completion of a translation, a back-edit review of the translated document (STEP 14) is performed. The back-edit review (STEP 14) evaluates the translation vendor's work product and, more specifically, evaluates the work product for safety-related and/or serious errors that could lead to harm or damage to the consumer.

The back-edit review (STEP 14) is performed by a linguist whose native language is the same as the source text. In the back-edit review (STEP 14), the Back-Editor reviews the translation of elevated-risk, safety-related portions of the translated document against the source language to ensure that these elevated-risk portions of the translated document have been properly translated. A back-edit review (STEP 14) is a cognitive equivalent of a back-translation, only without another document being produced.

Results from the back-edit review (STEP 14) can be used to formulate a cross-reference of hazards or "forced errors" (STEP 15). "Forced errors" are errors that are "forced" due to the structure of the source language construction. For example, double negatives may force translation errors if the translator translates the source text affirmatively rather than including the double negative.

Because the "forced errors" were not originally forecast, none of the resources was expecting such an error. As a result, recognition of a "forced error" in one connection with one target-language translation is assumed to provide indicia of similar translation or potential translation errors in connection with each of the other target languages. In short, each "forced error" is subject to review in all project materials for all translation target languages, including any materials previously delivered.

Technical Risk

Text to be translated is conventionally captured in a structured electronic format, e.g., a formatted, print-ready Quark Xpress file or its equivalent. For marketing or regulatory reasons, however, it is often a requirement that the translated material be modified in such a way that it mirrors the original source document in overall appearance, structure, format and/or layout. These technical requirements can introduce error through required text or formatting modifications.

Linguistic Risk

Every document has the potential of containing linguistic ambiguities, obscured meaning, lack of clarity, or other linguistic complexities that may render the text difficult to translate accurately. These situations and ambiguities increase the risk of linguistic error, which can be caused by lack of context, flawed writing, e.g., content and/or style, high degree of inference, lack of clarity, and so forth. In addition, the complexity of the subject matter may require the text to be linguistically complex and difficult to follow.

Product Risk

Product risk is defined through the subject matter of the document and varies with the risk of the product or service described. For instance, in the medical translation field, surgical instructions for a cardiac stent will carry a higher product risk than the product label for a wound dressing.

High product risk can dramatically elevate the severity of a translation error. However, product risk can be assessed using existing, industry-specific tools and classification categories. One example of such a tool is the product classification system used for medical and in-vitro diagnostics (IVD) devices, which can be utilized to determine the product risk for translation purposes.

Product risk, which includes medical device documentation (in general) and labeling requirements (in particular), and the intended use or application of the corresponding labeled document determine the overall project risk level and, furthermore, trigger a pro-forma risk management plan(s).

For example, calculation of initial project risk (STEP 4), takes into account the risk classifications (STEP 5) promulgated by national (such as the Food and Drug Administration (FDA), multi-national (such as the European Union (EU)), and/or international organizations. Such risk classifications (STEP 5), typically, are device-specific classifications. For example, the FDA classifies medical devices (MD) and in-vitro diagnostic devices (IVD) as Class I, Class II or Class III. The EU classifies medical devices as Class I, Class IIa, Class IIb and Class III and IVD as general, self-testing, Annex II List A, Annex II List B, and Performance Evaluating. Canada uses a four-level classification scheme.

Referring to Table I, in ascending order of risk, the EU medical device classifications are: Class I, Class IIa, Class IIb and Class III. The IVD "general" classification roughly corresponds to Class I. The IVD "self-testing" classification roughly corresponds to the Class IIa. The IVD "Annex II, List B" classification roughly corresponds to the Class IIb. The IVD "Annex II, List A" classification roughly corresponds to Class III.

The calculation of initial project risk (STEP 4), also takes into account the device document type and the intended use for the document (STEP 6). Device document types can include labeling such as information for use (IFU), product inserts, training letters or memoranda, product recall letters, software user interfaces, Web sites, regulatory submissions, marketing and sales data, and so forth.

TABLE I

| MDD classification | IVD classification |
|---|---|
| Class I devices are generally regarded as low risk and include most non invasive products, certain invasive products, and reusable surgical instruments. | General |
| Class IIa devices are generally regarded as medium risk and include both invasive and non invasive products, generally for short-term use. This class includes some wound dressings; certain products that channel and store blood for administration into the body; surgically invasive devices for transient or short-term use; most active therapeutic devices that administer or exchange energy; and active diagnostic devices that supply energy (other than for illumination) absorbed by the body, such as ultrasonic imagers. | Self-testing |
| Class IIb devices are also regarded as medium risk, but this class covers active products therapeutically delivering energy or substances at potentially hazardous levels. Devices placed in this class include blood bags, chemicals that clean or disinfect contact lenses, surgically invasive devices for long-term use, radiological equipment, and condoms and other contraceptive devices (except for intra-uterine devices, which are in Class III). | Annex II List B—which, amongst others, includes self-test kits for rubella, toxoplasmosis and phenylketonuria test kits, as well as self-test devices for blood glucose |
| Class III devices are generally regarded as high risk and include products that are used to diagnose or monitor or that come in contact with the circulatory or central nervous system, such as vascular grafts. This category also includes devices that incorporate medicinal products, such as bone-cement containing an antibiotic. | Annex II List A—which includes test kits for HIV, HTLV and Hepatitis and some blood grouping products including those used to test donated blood. |

The calculation of project risk (STEP 4), also accounts for hazards that are historically associated with commercial translation activity (STEP 7). A "hazard" as used herein is defined as a source of serious error risk. Referring to Tables II through VIIA/B, there are shown representative, non-exhaustive lists of known potential hazards and contributing factors that can increase serious error risk through human translation activity. Also shown in Tables II through VIIA/B are mitigation measures and process controls that may be incorporated into the Project Risk Calculator (STEP 4). Those of ordinary skill in the art can appreciate that each of the remedial resource and process measures includes additional layers of secondary or derivative risk that must itself be taken into account.

Table II shows hazards and contributing factors in connection with the customer information exchange (STEP 1). Table III shows hazards and contributing factors related to source content. Table IV shows hazards and contributing factors in connection with project management. Table V shows hazards and contributing factors related to DTP. Table VI shows hazards and contributing factors in connection with translation memory processing. Table VIIA shows hazards and contributing factors related to QA/QC. Table VIIB shows hazards and contributing factors associated with human resources.

TABLE II

Hazards and contributing factors related to Client Requirements/Specifications

| Hazard | Mitigation/Controls |
|---|---|
| Insufficient or incorrect project specifications | Communication with client for clarification of required specifications (client education about translation process and resources may be required) <br> Documented/controlled project specifications; Translation Quality Plan, Project Plan, Client Dossier, document/print specifications (additional custom specification forms as required <br> Pro-Forma Risk Management Plans provides general process guidance in case detailed specs are not available |
| Overly complex instructions/specifications | Revisit/discuss requirements and specifications with client and functional areas <br> Break project down into sub-components and milestones for more structured planning <br> Detailed project planning and strategy <br> Consider custom planning tools appropriate for project complexity |
| Rush turnaround requirements | Client communications/negotiation <br> Advanced scheduling of resources <br> Utilize time zones, weekend resources, <br> Staggered production and delivery schedule on large rush projects |
| Insufficient or deficient reference material (e.g., legacy translations) | Request additional resources from client <br> Obtain $3^{rd}$ party references/resources (literature, internet, etc.) <br> Exclude questionable references from consideration (such as deficient legacy translations) |
| Inconsistent file naming conventions | Create clarifying file list/matrix <br> Tag files for easier internal tracking |
| Inaccurate redlines or change tables | Document change verification prior to project start (proofreading or verification through client), client sign-off |
| Mid-project document changes | Analysis/evaluation for best method of incorporating changes into workflow (interrupt current process, parallel process, manual updates, etc.) |
| Uncontrolled client review activities | Educate client about linguistic review process <br> Determine review purpose and objective (QA, stylistic, sign-off, etc.) <br> Direct communication with reviewers <br> Implement reviewer change control process (Crimson review and assessment of changes) |
| Unorthodox linguistic specifications | Analyze and assess scope of requirements with LQA <br> Educate client about quality impact and added risk of forced linguistic specifications <br> Educate client about lack of benefit and risks of forced cross-language consistencies <br> Develop detailed guidelines for linguists and QA staff for required linguistic specifications |

TABLE III

Hazards and contributing factors related to Source Content

| | |
|---|---|
| Obscure, novel, or highly specialized subject matter <br> Excessive use of jargon <br> Inconsistently written content (stylistic) <br> Inconsistent use of terminology <br> Lack of sufficient grammatical context (e.g., isolated strings/fragments) <br> Lack of sufficient subject matter context <br> Lack of subject matter/product reference | Mitigation for these items include: <br> Crimson linguistic style guides <br> LRA (report) <br> Clarification by client <br> Develop project lexicon and client glossary <br> Obtain and provide context through appropriate reference materials (text and/or graphics) |
| Ill-defined target audience | Obtain more detailed target audience specification from client <br> If target audience general, adjust translation style accordingly (coordinate |

TABLE III-continued

Hazards and contributing factors related to Source Content

| | |
|---|---|
| | educational/reading level requirements with client) |
| Updates to legacy translations of questionable source or quality | Audit/QA legacy portions prior to update<br>If audit/QA prohibitive, probe legacy translations for terminology and style and match to the extent allowable |

TABLE IV

Hazards and contributing factors related to Project Management

| | |
|---|---|
| Project complexity (resulting in hand-off errors) | Revisit/discuss requirements and specifications with client and functional areas<br>Conduct Project Kick-Off Meeting<br>Break project down into sub-components and milestones for more structured planning<br>Detailed project planning and strategy<br>Consider custom planning tools appropriate for project complexity<br>Consult/develop Client Dossier<br>Update Client Dossier with post-mortem information |
| Large number of source files<br>Large number of target languages | Controlled project directory structure for effective document control |
| Multiple source document formats | Use custom file list/matrix to organize project files and language requirements |
| Miscommunication or lack of communication | Documentation of specification related communications (Correspondence and Specifications folders)<br>Communication redundancy (reiterate/rephrase complex descriptions of specifications/requirements)<br>Communication diversity (if oral instructions are provided, provide written communication support and vise versa) |
| Project transfer between Project Managers | Effectively documented/maintained Risk Management File and process forms<br>Structured hand-off meeting |
| Insufficient production and QA system capacity | Increase production time<br>Increase resource pool (short term/long term) |

TABLE V

Hazards and contributing factors related to Desktop Publishing

| | |
|---|---|
| Highly manual formatting tasks | Increased rigor in Formatting QA |
| Copy/paste activities | Inform FQA for increased rigor/specific focus<br>Cut&paste logical full segments (avoid numerous small segments or individual words)<br>"track changes" when cutting/pasting from Word |
| Unintended joining/breaking of segments | Formatting Optimization<br>Segmentation check (full or spot/risk-based) |
| Accidental deletion of text | Specific FQA focus/techniques (sentence/paragraph counts, etc.) |
| Typing of text (particularly, typing of foreign language text by unqualified resource) | Final Linguistic Inspection<br>Post-DTP BackEdit |
| Extensive Formatting Optimization | Consider re-formatting over formatting fixes<br>Formatting QA on FO'ed file |
| File exchange complexities<br>Import/export between applications<br>File format conversations | Technical references and resources for DTP staff<br>DTP staff training |
| Language related technical complexities<br>Uncontrolled character set conversions | Apply FLI step for control of character/script related complexities |
| Character corruptions or replacements<br>Application related complexities<br>Font substitutions<br>Automated text references of all kind | Apply focused proofing steps (e.g., TO check, etc.) |

TABLE VI

Hazards and contributing factors related to Translation Memory Processing

| | |
|---|---|
| File import/export errors | Pre-flight/Pseudotranslation |
| Incorrect or misleading text segmentation | Segmentation check (full or spot/risk-based) |
| Translation memory degradation over time | Assess memory quality in regular intervals to determine risk level |
| | Edit pre-translated exact matches on high risk memories |
| | LBE gating of green match comments |
| High risk translation memories (memories with demonstrated or presumed serious error risk) | Assess memory quality in regular intervals to determine risk level |
| | Edit pre-translated exact matches on high risk memories |
| Incorrectly linked memory database | Pre-flight/Pseudotranslation |

TABLE VIIA

Hazards and contributing factors related to Quality Assurance

| | |
|---|---|
| Proofreading against wrong source file | Controlled project directory structure for effective document control |
| Overriding of specifications ("Overcorrection") | Ensure complete, detailed project specifications Training/feedback |
| Zero-value QA findings | Provide detailed task guidance via FQA Work Request Training/feedback |

TABLE VIIB

Hazards and contributing factors related to Human Resources

| | |
|---|---|
| Assignment of unsuitable or unqualified resource | Utilize Vendor Db functions effectively |
| | Log resources issues to VDB (for trending) |
| Inability to execute (quality/time) | Provide clear instructions/specifications |
| | Allow ample time for task completion |
| | Avoid rushing tasks/resources (consider multiple resources and parallel processes instead) |
| Insufficient competency, experience, or education | Utilize Vendor Db functions effectively |
| Lack of subject matter expertise | Log resources issues to VDB (for trending) |
| Unfamiliar with task | |
| Lack of source language comprehension (linguistic resources) | |
| Market supply limitations in minor languages and languages of lesser commercial diffusion | Strategic recruiting and vendor tiering |
| | Increase production time lines |
| Overloaded resources | |

Once a Risk Assessment Calculator (STEP 4) has been created and a project risk score 11 has been calculated from the weighted average of the individual risk sub-areas, a Risk Management Plan can be formulated (STEP 8). The Risk Management Plan (STEP 8) is adapted to integrate the product- or task-specific results of the Risk Assessment Calculator (STEP 4) into an appropriate pro-forma risk management plan (STEP 9). The Risk Management Plan (STEP 8) matches the closest equivalent pro-forma risk management plan (STEP 9) to suit the specific project type. However, when a closest match is not evident, the process can include formulation of a non-standard process from scratch, which, when completed, can be added to the database of pro-forma risk management plans (STEP 9).

The pro-forma risk management plans (STEP 9) include mitigation processes that take in consideration device risk classification, document intended use, and target audience. The pro-forma risk management plans (STEP 9) provide guidance tools and suggestions to service provider managers for characterizing the various documents according to device risk classifications.

For example, Table VIII lists recommended process steps and additional guidance for labeling in which safety related information in the material is very dense, such as for Class II or Class III and/or medium or high risk IVD classifications. The process guidance is designed to eliminate serious errors and to minimize the occurrence of minor errors throughout the document.

LO/LRA refers to "Linguistic Optimization/Linguistic Risk Analysis". FO refers to "Formatting Optimization". FQA refers to "Formatting Quality Assurance". FLI refers to "Final Linguistic Inspection".

TABLE VIII

| Recommended Process Steps | Additional Guidance/Notes |
|---|---|
| LO/LRA | Primary objective: ensure semantic accuracy and completeness of translated content, prevent serious translation errors |
| | Focus on high-risk information and specific linguistic hazards |
| | Ensure consistent application of critical terminology through glossary/lexicon development (required) |
| FO | Focus on reduction of high risk formatting operations, e.g., heavy re-flow, copy/paste operations, etc. |
| | Ensure proper text segmentation through optimized document structure and text formatting |
| Translation | Employ Tier 1 resources |
| | Tier 2 translator must be paired with Tier 1 edit, or vice-versa |
| Edit | Employ Tier 1 resources—Tier 2 editor must be paired with Tier 1 translator, or vice-versa |

TABLE VIII-continued

| Recommended Process Steps | Additional Guidance/Notes |
|---|---|
| BackEdit ™ | Employ Tier 1 resource—Focus on semantic accuracy and completeness<br>LO/LRA-BE loop for linguistic risk mitigation<br>LBE to manage cross-language hazard check for increased Risk Management |
| DTP/Formatting | Maximize FO effectiveness to minimize risky manual text manipulation (copy/paste, typing, heavy reformatting)<br>Implement appropriate FQA controls |
| FQA | 3 rounds recommended on projects of higher formatting complexity<br>At least one Tier 1 resource involved at Round 1 or Round 2<br>Utilize dedicated checks and customized proofreading process/checklists for high-risk items<br>Proofreading pre-flight recommended on projects with high complexity and many languages (to increase proofreading effectiveness) |
| FLI | Required for most 2-column BE projects<br>Employ Tier 1 resource |
| Other | N/A |

Table IX lists recommended process steps and additional guidance in connection with material that also contains a significant amount of safety-related information but for labeling lower-risk devices, such as Class I devices and/or general IVD classifications. The process guidance is similarly designed to eliminate serious errors and to minimize the occurrence of minor errors throughout the document; however, in a more cost-effective, temporally-abbreviated process.

TABLE IX

| Recommended Process Steps | Additional Guidance/Notes |
|---|---|
| LO/LRA | Primary objective: ensure semantic accuracy and completeness of translated content, prevent serious translation errors<br>Focus on high-risk information and specific linguistic hazards<br>Ensure consistent application of critical terminology through glossary/lexicon development (optional, depending on subject matter complexity and client requirements) |
| FO | Ensure proper text segmentation through optimized document structure and text formatting<br>Focus on reduction of formatting cleanup time |
| Translation | Tier 1 or Tier 2 resource<br>Tier 1 must be utilized if process is abbreviated (e.g., Translation/BackEdit only) |
| [Edit] | Tier 1 or Tier 2 resource<br>Step is optional and may be omitted if linguistic error risk is low and Tier 1 vendor is utilized for translation |
| [BackEdit ™] | Employ Tier 1 resource if process is abbreviated (i.e., no edit)<br>Focus on semantic accuracy and completeness<br>LO/LRA-BE loop for linguistic risk mitigation<br>Step is optional and may be omitted if linguistic error risk is low and stylistic concerns prevail (in this case, use Edit as linguistic control)<br>LBE guidance optional, depending on level of linguistic risk and number of languages |
| DTP/Formatting | Maximize FO effectiveness to save formatting clean-up time<br>Implement adequate FQA controls<br>Consider outsourcing lower risk, high-volume formatting work in favor of higher risk projects to be processed in-house (proofing round implementation preferably to remain in-house) |
| FQA | 2 rounds on most projects<br>Employ Tier 1 resource if less than 2 rounds<br>Proofreading pre-flight recommended on high volume/multi-language documents (to reduce proofreading time) |
| [FLI] | Optional strategic application of FLI step to mitigate specific linguistic risks (e.g., FLI higher risk items or areas if BE step is omitted) |
| Other | N/A |

Table X lists recommended process steps and additional guidance for use in connection with relatively lengthy documents, e.g., 30+ pages, material that includes a combination of safety-related and lower-risk information, such as operator and service manuals. The process guidance is designed to eliminate serious errors in high-risk sections related to safety-related information and to minimize the occurrence of minor errors throughout the document.

TABLE X

| Recommended Process Steps | Additional Guidance/Notes |
|---|---|
| LO/LRA | Primary objective: ensure semantic accuracy and completeness of translated content, prevent serious translation errors<br>Focus on high-risk information and specific linguistic hazards<br>In longer documents, segment content by risk level, identify hazards in high-risk sections only (reduced, strategic LO/LRA)<br>Ensure consistent application of critical terminology through glossary/lexicon development |
| FO | Focus on reduction of high risk formatting operations, e.g., heavy re-flow, copy/paste operations, etc.<br>Ensure proper text segmentation through optimized document structure and text formatting |
| Translation | For Operator Manual, employ Tier 1 resource—Tier 2 translator must be paired with Tier 1 editor<br>For Service or Maintenance Manuals, utilize Tier 2 resources<br>If abbreviated process (no Edit or BE) is utilized for lower-risk information, employ Tier 1 resource |
| [Edit] | For Operator Manual, employ Tier 1 resource—Tier 2 should be paired with Tier 1 translator<br>Service or Maintenance Manuals may utilize Tier 2 resources. If abbreviated process is utilized for lower-risk sections (e.g., no Edit or no BackEdit), employ Tier 1 translation resource. |
| [BackEdit ™] | Employ Tier 1 resource if process is abbreviated—Focus on semantic accuracy and completeness<br>LO/LRA-BE loop for linguistic risk mitigation<br>Consider segmentation of material by risk for partial BE activity |
| DTP/Formatting | Maximize FO effectiveness to save formatting clean-up time<br>Implement adequate FQA controls<br>Consider outsourcing lower risk, high-volume formatting work in favor of higher risk projects to be processed in-house (proofing round implementation preferably to remain in-house) |
| FQA | 2 rounds on most projects<br>Employ Tier 1 resource at Round 1 or Round 2<br>Proofreading pre-flight recommended on high volume/multi-language documents (to reduce proofreading time) |
| [FLI] | Strategic application of FLI step to mitigate specific linguistic risks (e.g., FLI higher risk items or areas if BE step is omitted)<br>Employ for 2-column BE if E or BE is skipped |
| Other | N/A |

Table XI lists recommended process steps and additional guidance in connection with translation of material that partially or indirectly supports an internal decision process but that, typically, is not published. The process guidance is designed to eliminate serious errors and to minimize the occurrence of minor errors throughout the document when translation is critical for the design process. When cost or timing is more important than quality/reliability, then the process guidance is designed to permit the nominal occurrence of minor errors throughout the document.

TABLE XI

| Recommended Process Steps | Additional Guidance/Notes |
|---|---|
| LO/LRA | Generally not required, employ only if step yields cost or time savings |
| FO | Generally not required, employ only if step yields cost or time savings |
| Translation | May utilize Tier 1 or Tier 2 resource (native English speaker) |
| Edit | Generally not required for informational translation |
| BackEdit ™ | Non-native English translation resource may serve in this role. Consult PM/LQA for suitable resources |
| DTP/Formatting | Typically no replica of source layout required (formatting for comprehension only) |
| FQA | Generally 1 round only—focus on higher-risk sections/items (e.g., numerals) |
| FLI | Generally not required |
| Other | N/A |

Table XII lists recommended process steps and additional guidance in connection with information designed to support product sales, e.g., marketing material, to influence a consumer's purchase decision. The process guidance is designed to eliminate serious errors and to minimize the occurrence of minor errors while recreating in the target document the intended meaning and linguistic effect of the source document.

TABLE XII

| Recommended Process Steps | Additional Guidance/Notes |
|---|---|
| LO/LRA | Special focus on coined terms, marketing and industry-specific jargon, with emphasis on idiomatic rendering of English source<br>Focus is technical accuracy and product marketability<br>Consider cultural-linguistic aspects during analysis<br>Client-approved "style guide" preferred |
| FO | Focus on reduction of high risk formatting operations, e.g., heavy re-flow, copy/paste operations, etc.<br>Ensure proper text segmentation through optimized document structure and text formatting<br>Consider localization impact on layout and branding |
| Translation | Tier 1 resource required if abbreviated process is utilized (e.g., translation-BackEdit)—assuming controlled client review<br>Use of client-approved style guidance encouraged |
| Edit | Pair technical Tier 1 resource with experienced copy writer/translator (or vice versa) |
| BackEdit ™ | Employ Tier 1 resource if process is abbreviated—Focus on high-risk "labeling" sections (if present) |
| DTP/Formatting | Maximize FO effectiveness to save formatting clean-up time<br>Implement adequate FQA controls<br>Consider outsourcing lower risk, high-volume formatting work in favor of higher risk projects to be processed in-house (proofing round implementation preferably to remain in-house) |
| FQA | Employ Tier 1 resource at Round 1 or Round 2 |
| FLI | Employ native speaker |
| Other | Client review encouraged to ensure optimal rendering of industry-specific terminology, coined terms, and marketing jargon as well as conformity with preferred style |

Table XIII lists recommended process steps and additional guidance in connection with material designed to communicate training concepts to internal audiences and/or end users, such as non-labeling instructional and/or training material. The process guidance is designed to eliminate serious errors and to minimize the occurrence of minor errors, recognizing that the document does not serve the same direct risk management function as labeling because of its use in connection with training personnel.

TABLE XIII

| Recommended Process Steps | Additional Guidance/Notes |
|---|---|
| LO/LRA | Special focus on coined terminology, company-specific jargon, with emphasis on idiomatic rendering of English source.<br>Focus is technical accuracy and instructional value/comprehension<br>Client-approved style guidance preferred |
| FO | Focus on reduction of high risk formatting operations, e.g., heavy re-flow, copy/paste operations, etc.<br>Ensure proper texts segmentation through optimized document structure and text formatting |
| Translation | Tier 1 resource required if abbreviated process is utilized (e.g., translation/BackEdit)—assuming controlled client review<br>Use of client-approved style guidance encouraged |
| Edit | Tier 2 should be paired with Tier 1 translation or vice versa. |
| BackEdit ™ | Employ Tier 1 resource if process is abbreviated—Focus on high-risk "labeling" sections (if present) |
| FQA | Employ Tier 1 resource at Round 1 or Round 2 |
| FLI | Refer to LO/LRA for high-risk<br>If required, employ target native speaker |
| Other | Client review encouraged for materials or high profile or high visibility to ensure preferred rendering of industry-specific terminology, coined terms, and corporate jargon as well as conformity with preferred style |

Table XIV lists recommended process steps and additional guidance in connection with text strings used in interfaces of software driven devices, as well as validation of such content. The process guidance is designed to eliminate serious errors and to minimize the occurrence of minor errors, recognizing that the information is used in the context of operating a software application.

TABLE XIV

| Recommended Process Steps | Additional Guidance/Notes |
|---|---|
| LO | Special focus on abbreviations, character-length limitations, and context<br>Additional emphasis on consistency with associated labeling |
| FO | Generally not required |
| Translation | Tier 1 resource required if abbreviated process is utilized (e.g., translation/BackEdit)—assuming controlled client review. |
| [Edit] | Optional, depending on text volume, language(s), subject matter complexity, and product risk<br>Tier 2 should be paired with Tier 1 translator, or vice versa |

TABLE XIV-continued

| Recommended Process Steps | Additional Guidance/Notes |
|---|---|
| BackEdit | Employ Tier 1 resource if process is abbreviated (no edit) |
| FQA | Generally abbreviated—check for completeness, numerals, etc. |
| FLI | Generally not required (validation serves this purpose) |
| Other | Validation of string translations in context—risk-based validation strategy to be determined prior to localization |

Once the service provider manager has settled on the most appropriate pro-forma risk management plan (STEP 9) and has combined and integrated the Risk Assessment Calculator data (STEP 4) to formulate a risk management plan (STEP 8), and, moreover, is satisfied that the pro-forma plan adequately addresses customer requirements and overall project risks; that all general production risks are or can be effectively mitigated by the process steps in the pro-forma plan; and that sufficient modifications and/or additions to the pro-forma plan can account for any uncertainties to cover all areas of elevated project risk, then the risk management plan (STEP 8) can be put into effect and aggressively executed (STEP 10). An exemplary Project Risk Management Report for use during execution of the process is shown in FIG. 3.

Execution of Risk Management Plan

A flow chart illustrating the second (execution) phase of the risk management process is shown in FIG. 4. The flow chart begins where the initial phase left off, which is to say, with formulation of a Project Risk Management Plan (STEP 8). The service provider manager first must select a translating vendor (STEP 11), e.g. a source-language native speaker, to translate the documents from the source language to at least one target language. The translating vendors can include internal translators as well as external translating vendors.

Figure 5:
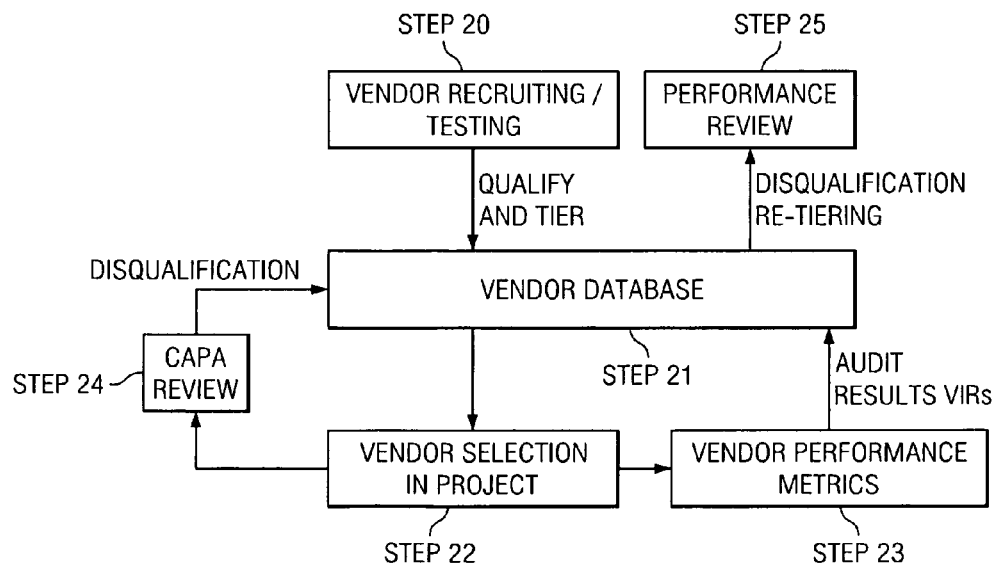
FIG. 5 shows a flow chart of an illustrative method of resource risk management in accordance with the present invention.

Referring to FIG. 5, a flow chart for a resource risk management process is shown. In the context of the flow chart "resource" refers to each of the translator vendors who may be engaged in-house or externally, to perform some aspect of the translation (STEP 12). In most commercial transactions, critical linguistic activities, e.g., translation, linguistic QA/QC, and the like, are typically performed by external and/or internal translation vendors. Conventionally, vendors are contracted for on a per-project basis. However, due to the critical nature of translated medical device labeling, the qualification, competence, and skill of translators, editors, and linguistic QA/QC personnel can have significant impact on mitigation of the risk to consumer safety.

The disclosed risk management process is a risk-based system that includes vendor qualification, testing, and audit, to ensure the effective mitigation of linguistic resource error, which is to say that differentiations are drawn based on the relationship between "serious" errors as previously defined and "minor" or non-serious errors. Accordingly, the resource risk management portion of the disclosed method includes recruiting and evaluating the degree of expertise of vendors (STEP 20) and maintaining a vendor performance database (STEP 21) that includes the name(s) and other pertinent commercial and performance information about each vendor as well as the qualifications and tier of the same. The vendors' qualifications and "tiering", which was discussed in greater detail above, are maintained in the database from which a project-specific vendor can be selected (STEP 22).

FIG. 6 shows an exemplary translation evaluation form that can be used to evaluate the work product of a prospective translation vendor. Scoring to distinguish between serious errors and minor errors can be conducted using SAE J2450 Translation Quality Metric (STEP 23), the nature of which is well-known to those of ordinary skill in the art and will not be discussed further.

To ensure the continuing provision, quality, and effectiveness of linguistic resources, periodic, scheduled, e.g., semi-annual, performance reviews can be conducted (STEP 25) using vendor performance metrics (STEP 23). Vendor performance metrics (STEP 23) can include, for example, remarkable vendor-related results from previous or on-going linguistic QA/QC audits, feedback from linguistic QA/QC audits and/or project management personnel, e.g., characterization of (and the reasons for characterization of) the vendors as "top-performing" or "problem", and any general or systemic vendor problems, and any vendor incident reports (VIR), which are spot reports related to incidents involving the vendor as an entity or the vendor's personnel.

As the arrows in FIG. 5 show, vendor performance metrics (STEP 23) such as audit results and VIRs are transmitted to the vendor performance database (STEP 21), to update the vendor's performance profile. The audit results and VIRs can be summarized and passed on to the vendor as part of the scheduled performance review (STEP 25).

In addition to periodic, scheduled performance reviews non-scheduled, incident-based, corrective action/preventative action (CAPA) performance reviews can also occur (STEP 24). Corrective actions are initiated to correct a known problem. Preventative actions are initiated to prevent a problem from occurring.

Typically, CAPAs (STEP 24) are or can be triggered randomly, upon occurrence of, for example, a client complaint of any severity, QA/QC audit findings of an actual product or service non-conformance, acute resource issues, occurrences of new or previously unrecognized hazards to the production process, and so forth. For simplicity, all CAPAs (STEP 24) will be described as "acute vendor issues".

As shown in FIG. 5, acute vendor issues that occur downstream of the vendor selection (STEP 22), can lead to disqualification of the respective vendor and/or to a re-tiering of the vendor. These data are stored in the vendor performance database (STEP 21).

Referring again to FIG. 4, translation from a source language into each target language (STEP 12) includes the translation itself, verification of the translation ("editing"), and finalization of the translation ("edit verification"). The translation step (STEP 12) also includes input from a linguistic risk analysis (LRA) (STEP 13) that has been prepared by a Back-Editor. An illustrative example of an LRA is shown in FIG. 9.

The LRA (STEP 13) identifies likely translation hazards in the source text and provides guidelines for mitigation of these hazards prior to formal translation. Linguistic hazards include those items in a source document that, if mistranslated, pose a safety risk that could lead to harm or damage to the consumer. By identifying and resolving textual ambiguities and lack of clarity in the source document prior to translation or multiple translation, the risk of translation error is reduced. The LRA (STEP 13) also provides standardizations and guidelines to translators for identical treatment of text elements, e.g., numbers, units, conversions, proper names, and so forth, in each of the translations into different target languages. Advantageously, the LRA (STEP 13) also can be reported to the manufacturer so that the manufacturer can initiate change.

The Back-Editor subjectively determines the scope and the intensity of the LRA (STEP 13). Illustrative criteria and parameters associated with the LRA can include one or more of: the document risk level, the number of target languages, the language group, the length of the source document, budgetary and scheduling limitations, availability of relevant LRA information, and so forth.

In projects having relatively-high risk content and/or that involve translation of a single source text into multiple target texts, full source text review is preferred. However, with high volume projects, full review of the source text by the Back-Editor is impractical or prohibitive. In the later instances, linguistic risk information from each of the translators or Back-Editors can be gathered and reviewed by a lead Back-Editor while the translations are in-process. At a minimum, the LRA should include a check-for-hazards section, which is to say, a check for text portions that are known to carry safety function, e.g., warnings, cautions, and the like.

Back-Editing

After the translation (STEP 12) sub-steps of translation, editing, and edit verification have been completed, back-editing is performed on the translated document (STEP 14). The back-edit (STEP 14) is designed to identify any safety-related or serious errors in the translated document. Back-editing (STEP 14), which is performed by a linguist whose native language is the original source language, is unique to this process. The Back-Editor reviews the translated document carried out by the translation vendor primarily for safety-related errors that may cause harm or damage to the consumer.

Formatting, Formatting QA, and Final Project Audit

Upon completion of back-editing (STEP 14) and any associated remediation or mitigation connected with the back-edit, the translated content (STEP 17) is prepared for DTP/Formatting activities (STEP 18), and one or more rounds of QA/QC of the formatting (STEP 19) is performed.

Desktop Publishing (DTP) or Formatting activity in the translation process is often required to render the translated text in a structured format suitable for printing. It is uncommon for translation vendors to possess the professional DTP/formatting skills necessary for DTP/formatting or for the translation vendor to be equipped with the software required for such activity, e.g., QuarkXPress, Adobe InDesign, Adobe FrameMaker or Adobe Illustrator. Additionally, DTP file formats often lack adequate spell-check and hyphenation or special character support. For these reasons the translation is performed in an intermediary document format and the translated content is subsequently re-integrated into the original file format. In order to mitigate the error risks associated with this process, a subsequent check is required following the DTP/formatting activities.

Formatting QA/QC (STEP 19) transcends mere proofreading. The objective is not to translate, edit, and/or back-edit the target document one more time, but, rather, to identify visual errors and inconsistencies in the format of the target-language document.

Figure 7:
FIG. 7 shows an exemplary Formatting QA Checklist in accordance with the present invention.

An exemplary Formatting QA/QC Checklist is shown in FIG. 7. The Formatting QA/QC Checklist includes a non-exclusive list of errors and inconsistencies at the document and text levels to look for. These errors and inconsistencies can include, without limitation, such errors as truncated or missing text segments, untranslated text segments, missing or inconsistent formatting properties at the character, e.g., bold type, and paragraph level, e.g., alignment, indenting, etc., incorrect numerals or units, misspelled proper nouns, wrong or misplaced graphics, incorrect or inconsistent capitalization, incorrect or inconsistent cross-referencing, e.g., in the table of contents, index, and the like, incorrect or inconsistent spacing, punctuation and/or delimiters. In addition, the formatting QA/QC (STEP 19) ensures that the document adheres to local conventions and global standards, e.g., the SI (metric) unit system, and any project- or client-specific guidelines.

A final linguistic inspection (STEP 30) to review non-formatting discrepancies, i.e., a linguistic review, can be performed to mitigate specific risks associated with any required DTP/formatting and file conversion activities. Once the final linguistic inspection has been completed (STEP 30), a Final Project Audit (FPA) is performed (STEP 31) prior to delivery, to assess whether or not the deliverable product conforms to all project and process requirements. The scope of the FPA (STEP 31) can include verifying that all production and QA/QC steps have been executed in accordance with project specifications; reviewing the risk management file to confirm that all pre-conceived project risks have been effectively addressed and mitigated; performing a high-level review of all project deliverables, for example, to verify the correct target language, to observe any obvious non-conformances, and the like; and spot checking critical areas and special risk items such as non-conformance with respect to client-, project-, and/or task-specific instructions and specifications and remarkably-high-risk linguistic and formatting elements.

Negative findings during the FPA (STEP 31) may result in returning the document to a respective functional area for linguistic revision, corrective DTP/formatting, and the like. Once the negative findings have been resolved at the appropriate functional area, a second and, if necessary, a third FPA is performed.

When no further action is required, the FPA (STEP 31) and the Project Risk Management Plan (STEP 8) are summarized into a Risk Management Report (STEP 32) and, finally, the document that has been translated into the target language is released to the manufacturer (STEP 33) for distribution to an appropriate audience.

Although the invention has been described in connection with a medical device or IVD, the invention is not to be construed as being limited thereto. Those of ordinary skill in the art will appreciate that variations to and modification of the above-described device, system, and method. Accordingly, the invention should not be viewed as limited except as by the scope and spirit of the appended Claims.

What is claimed is:

1. A system for preparing a translation of a labeling document from a source to at least one target language, the system comprising:
   a medical device having a quantifiable risk classification;
   a medical device labeling document in the source language, the labeling document having an intended use in connection with the medical device and being translated from the source language to the at least one target language; and
   a risk calculator for assessing the translated labeling document for potential risk to a human from use of the medical device as a function of:
   the medical device risk classification,
   the intended use of the labeling document in the at least one target language,
   the source language, and
   the at least one target language,
   wherein the risk calculator requires additional translation efforts when the assessed potential risk exceeds a risk threshold.

2. The system of claim 1, wherein the device classification is on a numerical scale from 1 to 3 progressing from lowest risk at 1 to highest risk at 3.

3. The system of claim 1, wherein said medical device is one used in medical applications on human patients.

4. The system of claim 1, wherein said document identification means includes means for identifying the document type from a list comprising documents relating to training, instruction, marketing, Web site, adverse event reporting, recalls, or regulatory submission.

5. The system of claim 1, wherein said assessment-providing device is adapted to provide said assessment as a function of language hazards.

6. The system of claim 5, wherein said assessment-providing device is adapted to provide said assessment as a function of language and language character sets between the source language and at least one target language.

7. The system of claim 1 further including means for back-editing the translation document to review the translation using a translator whose native language is the source language.

8. The system of claim 1, wherein said assessment-providing device is adapted to provide said assessment as a function of a potential for serious consumer harm using a database having a table of error seriousness applied to the back-edition.

9. The system of claim 1 further comprising means for reviewing translation from the source language to at least one target language pertinent to the medical device as a function of the assessment relating to the translation from the source language to the at least one target language.

10. The system of claim 1, wherein said means for accessing and said means for identifying include a database containing a table of pro-forma risk management plans for similar documents and similar device classification.

11. The system of claim 1 further including a database the list of translation vendors for performing the translation, wherein performance of each translation vendor is rated as a function of the number of translation errors in prior translations and as a function of error seriousness.

12. The system of claim 11, wherein the rating is by document type.

\* \* \* \* \*

UNITED STATES PATENT AND TRADEMARK OFFICE
CERTIFICATE OF CORRECTION

PATENT NO. : 8,140,322 B2  Page 1 of 1
APPLICATION NO. : 12/012207
DATED : March 20, 2012
INVENTOR(S) : Kai Simonsen et al.

It is certified that error appears in the above-identified patent and that said Letters Patent is hereby corrected as shown below:

Column 26, line 39, "method." should read -- method are contemplated. --;

Column 28, claim 9, line 5, "to the" should read -- to --; and

Column 28, claim 11, line 10, "database the" should read -- database --.

Signed and Sealed this
Sixth Day of November, 2012

David J. Kappos
*Director of the United States Patent and Trademark Office*